Figure 5:
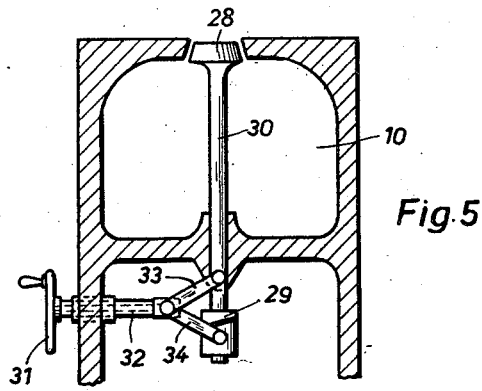

March 27, 1962  J. W. LUDOWICI  3,026,595
APPARATUS FOR BAKING CERAMIC MATERIAL
Filed Sept. 6, 1960  7 Sheets-Sheet 1
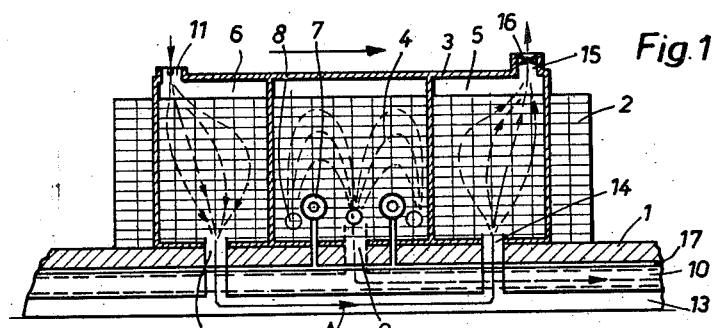
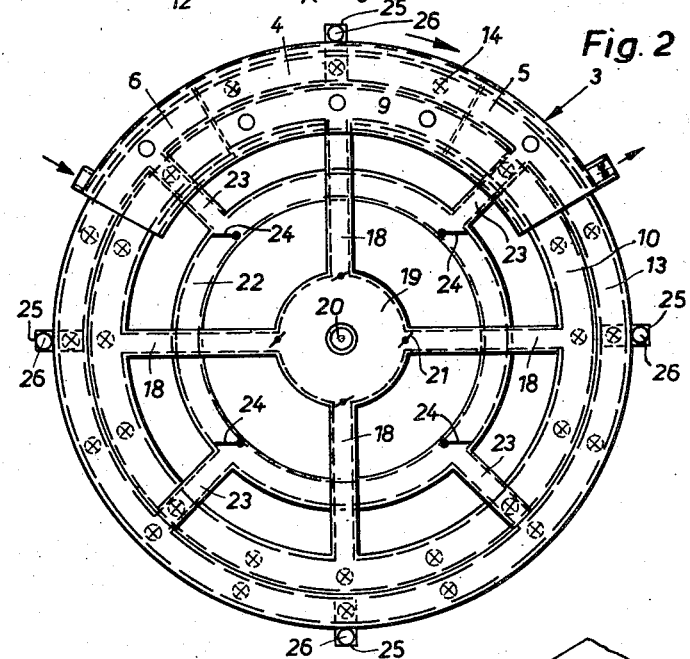
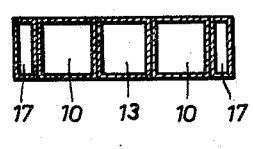
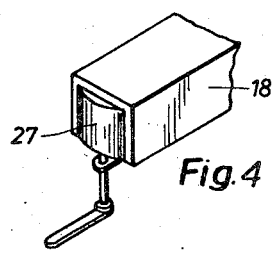

March 27, 1962  J. W. LUDOWICI  3,026,595

APPARATUS FOR BAKING CERAMIC MATERIAL

Filed Sept. 6, 1960  7 Sheets-Sheet 2

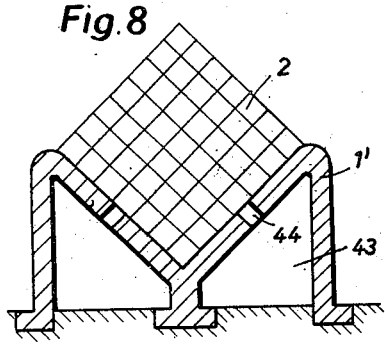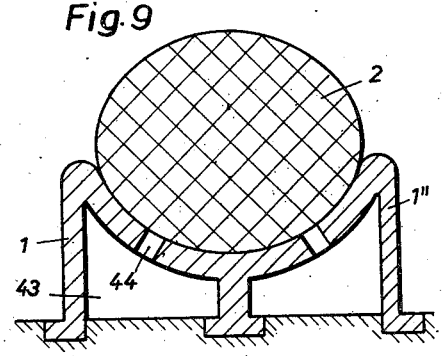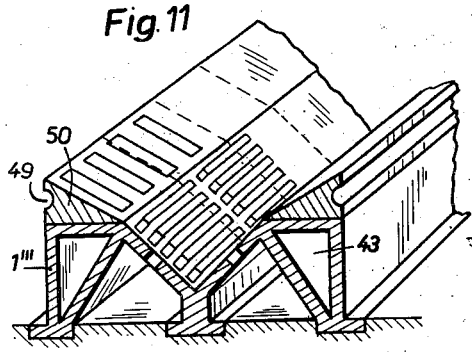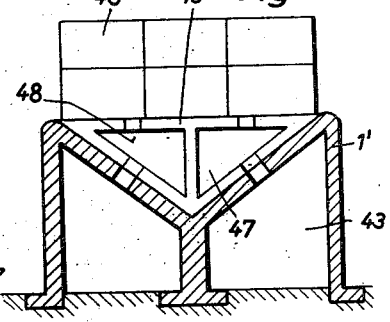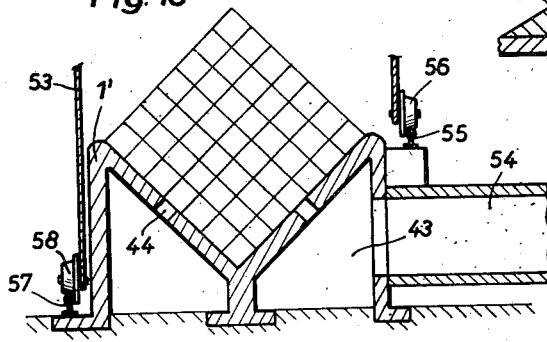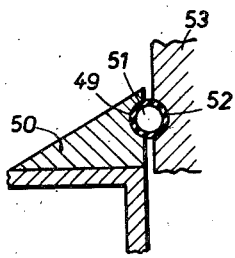

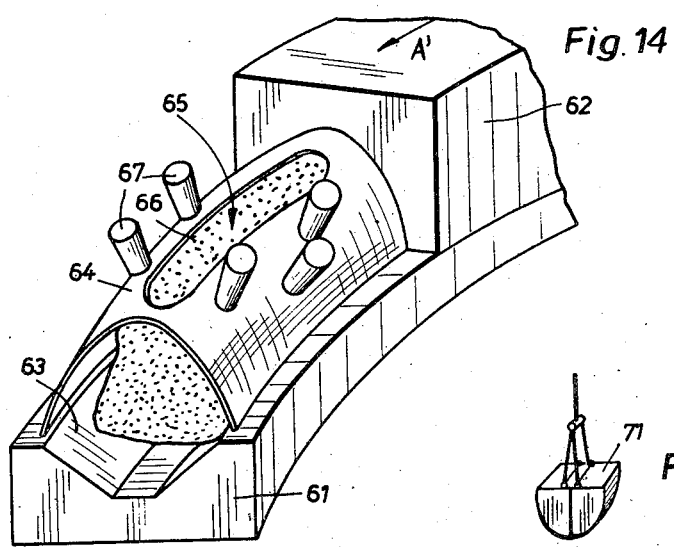
Fig. 14
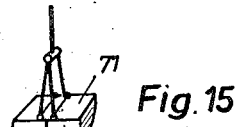
Fig. 15
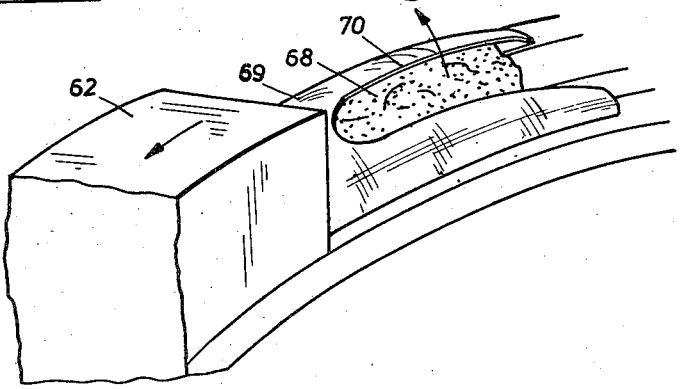
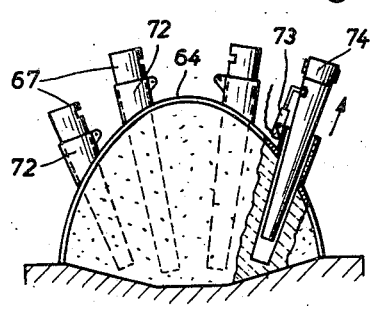
Fig. 16

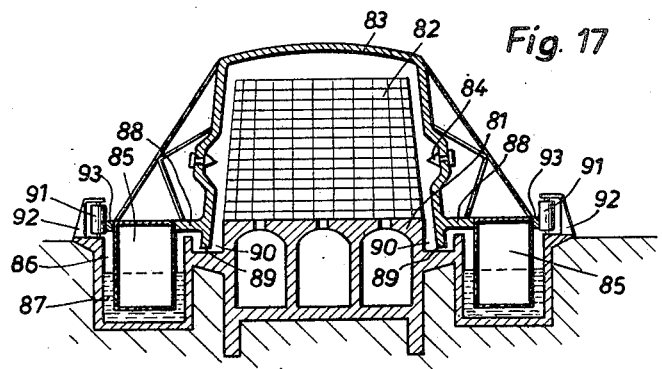
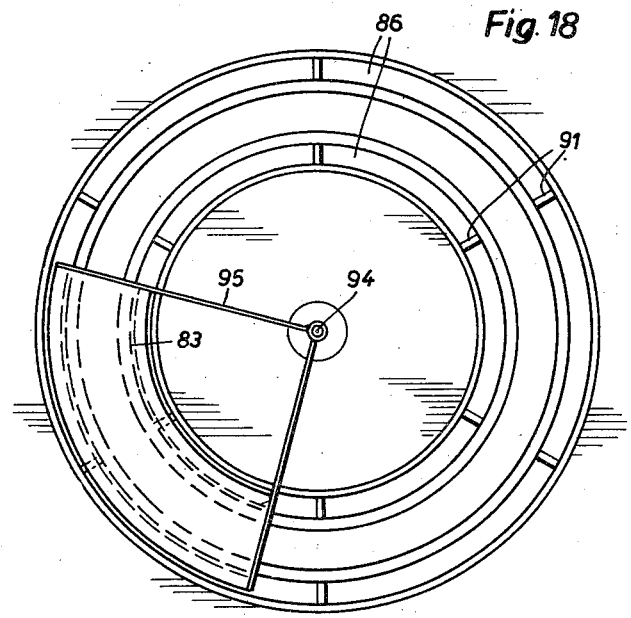

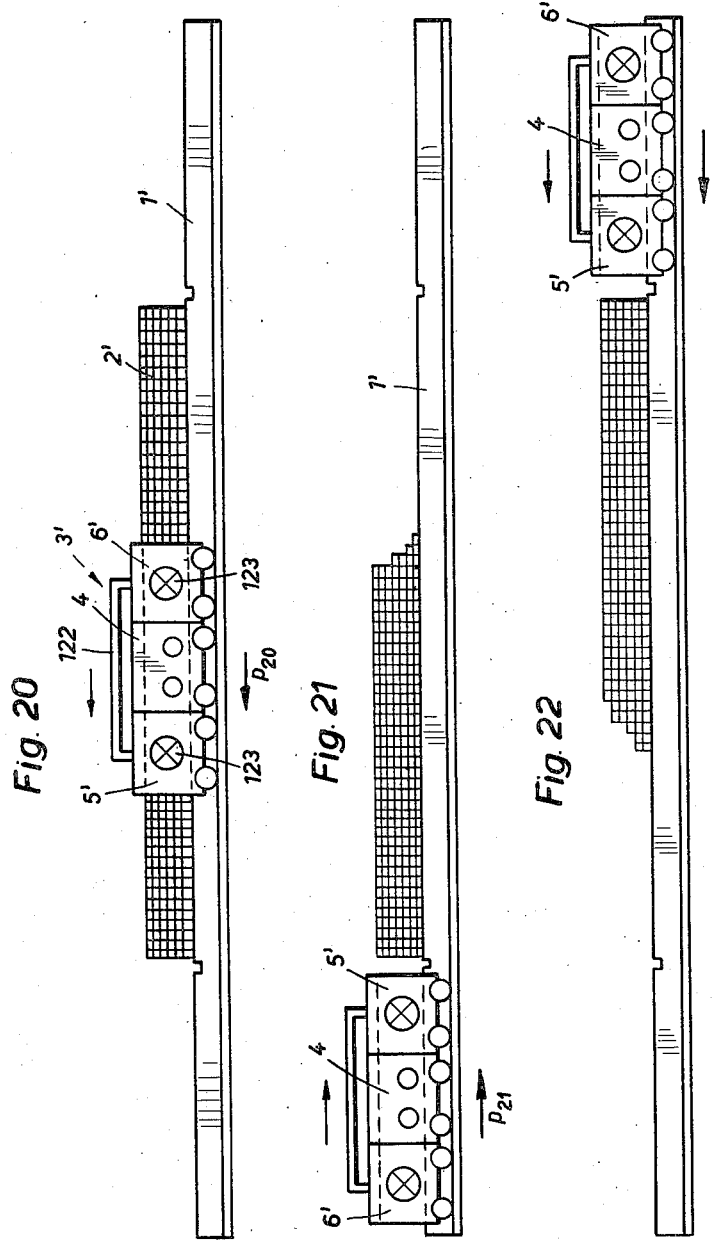

United States Patent Office 3,026,595
Patented Mar. 27, 1962

3,026,595
APPARATUS FOR BAKING CERAMIC MATERIAL
Johann Wilhelm Ludowici, Landhaus, Jockgrim, Pfalz, Germany
Filed Sept. 6, 1960, Ser. No. 54,048
6 Claims. (Cl. 25—134)

The present invention relates to apparatus for baking ceramic material of the type comprising a track on which the material to be baked is stacked, and a domed kiln movable along the stacking track and provided with preheating, burning, and cooling zones.

Movable kilns are known, which travel on a straight or circular rail track and continuously or intermittently pass over a stack of baking material placed on the track and thereby subject the stack first to preheating, then to baking and finally to a cooling process, an air current traversing the cooling zone being partly admitted to the preheating zone.

As in any oven, which is not destined to radiate heat energy outwardly, but to concentrate the heat produced by combustion with lowest possible losses and to uniformly supply said heat to the entire stack of material to be baked, particular provisions are required with respect to fire control, flue gas discharge, control of released heat, and finally expedients are necessary to limit to a minimum the dissipation of heat energy through the stacking track itself, in order to obtain an economical and rational production, particularly in the mass production of coarse ceramic structural elements.

According to the present invention an apparatus for baking stackwise placed ceramic material, comprising a stacking track and a domed kiln movable along the stacking track and provided with preheating, baking and cooling zones, is characterised in that the stacking track is arranged on an elevated pedestal. The stacking track and the outer boundary of the baking chamber are immediately included in the fire, flue gas and released heat passages, since the pedestal for the stacking track is comparatively high and is traversed by longitudinally directed ducts, whereby a flue gas duct and a released heat duct alternately are situated side by side. The heat still contained in the flue gases thus is additionally supplied to the released heat, which has the task of drying and preheating the stacking portion situated in the preheating zone as intensively as possible. This also means a regaining of the heat still contained in the flue gases without necessitating the use of a separate air heater. The upper boundary of the ducts is situated closely underneath the stacking surface, so that also the upwardly discharged heat is utilized. On the other hand, such an arrangement is inseparably connected with particularly formed fire and flue gas passages, whereby not only the above mentioned advantages will be obtained, but also a substantially uniform traversing of the stack of baking material through the current of the burning gases is achieved.

The increase in the height of the stacking pedestal results into the additional advantage that the stacking track will be placed outside of the moist ground and thus can be used at the same time as loading platform, and that a good heat insulation with respect to the ground will be provided, particularly by the arrangement of the internal ducts. In the conventional stationary oven, as is known, a considerable portion of the heat dissipates to the ground.

Moreover, due to the elevated position of the pedestal, the ducts can be made accessible and in addition by-passing and diverting ducts may be arranged, serving for the purpose of controlling the drying and baking operation by means of flaps and valves provided in these ducts. Thus, it is for instance possible in a circular track to radially interconnect the individual ducts, to selectively connect and disconnect the latter and to engage the particular duct sections coming into action during the continued travel of the kiln along the circular track.

Preferably the flue gas ducts are radially combined with a collecting chamber, situated in the center of the circular arrangement and forming a control center owing to its provision with flaps or valves, and the flue gases are withdrawn from said chamber by means of a flue gas ventilator and discharged into the open air.

In a similar manner, the hot air ducts can also be radially branched and extended to an annular collecting shaft provided with flaps or valves, which shaft then sectionally serves as by-pass duct from the cooling to the preheating zone. During the continued movement of the kiln always different flue gas as well as hot air duct sections are opened and shut off, so that the same operation continuously repeats itself.

In such an arrangement of the ducts, the often difficult removal of deposits and flue dust can be very simply carried out owing to the easy accessibility and the provision, if desired, of a predetermined falling gradient. Cleaning may also be effected in outward direction. The formation of flaps and valves in flue gas ducts requires a special construction. In a modification of the oven structure according to the invention mechanically actuated parts are placed outside of the duct zone.

The portions of the charge to be subjected to the drying, baking and coding operations placed on the circular stacking track preferably are adjusted in sections according to the segmental range of the hood-shaped kiln, so that in moving said kiln new zones of the change are successively included in the described process. The hood of the kiln is sealed in inoperative condition by means of an immersion closure arrangement, e.g. as known, by the provision of a groove filled with sand or water, but said hood may also be raised somewhat by a lifting device, for instance by hydraulic cylinders, to enable its displacement and thus permit it to slide across the stack of ceramic goods without damaging the latter. For this purpose a floating hood may also be used.

Naturally, the stack for securing free passage of the kiln hood must be accurately placed with respect to its outlines and must also not undergo any substantial change in its cross-section due to the baking process.

Various kinds of stacked articles require a particular manner of placing the articles for maintaining the sectional shape of the stack, during baking, for example the stack tapers upwardly, in order to avoid a falling apart of the stack on account of the baking process or due to shocks. A still better solution of the placing problem is to support the stack in the form of a prism or by a trough, in which latter case the parts projecting from the stacking track converge upwardly. The prismatic or dished support of the stack results into forces acting towards the center of the stack, and tending to hold the goods together, and also in sagging together, as it occurs with various baking goods, the dislocation of the goods does not take place outwardly beyond the sectional area of the stack, but in inward direction.

The enlarged supporting surface, moreover, results into a better distribution of the load across the stacking track. On the other hand, losses in space, as would otherwise occur with an upwardly converging cross-section, can be avoided by means of the trough-shaped formation.

Since a baking arrangement for ceramic mouldings represents a considerable investment, and may require a temporary conversion for treating other mouldings, provision is made to arrange the stacking track also for such other mouldings, for example hollow articles, namely by means of members insertable in the stacking track. The sides of the trough-shaped stacking track may terminate in a profiled, for example semicircular channel, which is facing a similar channel formation provided on the kiln hood, and in which channel, for the purpose of obtaining a perfect seal, a flexible packing tube is inserted and adapted to be inflated during standstill, while during shifting the hood of the kiln said tube is in deflated condition. The said channel can be provided in a separate formed piece, which is made of a material having lower heat conductivity to lessen temperature effects.

As already mentioned, flue gas and hot air ducts radially extend from the circular stacking pedestal in inward direction. Due to the above mentioned, special structural form of the stacking pedestal it is not necessary to provide the radially extending ducts underneath the kiln level in the ground floor, it rather is possible to branch off said ducts in the same plane from the stacking pedestal, because the inside of the movable kiln hood rolls on a rail situated above the radially arranged ducts.

In case of uniformly shaped pieces, such as bricks, roofing tiles and the like, fire stacks and aerating gaps can relatively easily be determined and arranged for the flash of fire to completely traverse the entire section of the stack of material, and also the outer contours of the stack can be observed accurately enough. The erection of a dimensionally accurate stack traversed by fire ducts as used for fragmentary or fine grained bulk material, such as broken line destined for calcining, is substantially more difficult.

In order to permit the baking also of such material, the kiln hood travelling across a stack can be provided with a concurrently advancing casing, into which the bulk material to be heat treated is filled in, after previously formed pieces have been introduced about radially towards the stack in order to maintain the fire ducts. After a section of the stack has been filled, said formed pieces are withdrawn, so that, when the kiln hood continues its travel, this completed stack section enters the baking process. The completely baked material may fall apart already in leaving the kiln hood or at least during the disassembly of the stack, and the collection of the material, fallen apart and scattered around, for example by means of a grabbing device would cause considerably more labour and loss of time than the handling of a compact mass. For this purpose at the rear of the kiln hood, a lateral casing is secured to move therewith, from which the material, as from a hopper, may be withdrawn through a suitable opening.

Preferably, the formed pieces are made somewhat conical, in order to facilitate loosening them and to ensure an improved stability of the channel walls. Disengaging the formed pieces from the stack may require considerable power depending on the kind of material, so that it is proposed to carry out the first loosening action by means of pneumatic or hydraulic pistons and in addition the head of each formed piece may carry a vibrator, which does not only facilitate the loosening operation, but also improves the filling degree of the cross-sectional area and results in a more durable formation.

For the purpose of continuous operation of the baking process the hood of the kiln may be formed as a floating hood, which may be raised and lowered in known manner by means of a liquid level and suitably displaced in raised condition, said floating hood also facing with an inner edge portion a base surface, upon which this edge portion can be placed with sufficient sealing action by lowering the hood, the annular tank containing the liquid in this case being subdivided by transverse walls into sluicelike chambers, in order to reduce the extent of the movement of the liquid required for raising and lowering the hood of the kiln.

The present invention will now be described in more detail with reference to the accompanying drawings illustrating, by way of example, several embodiments of the invention.

Figure 6:
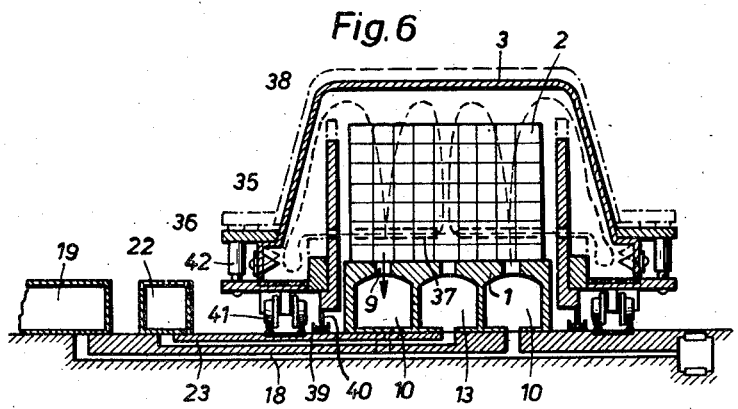
Figure 7:
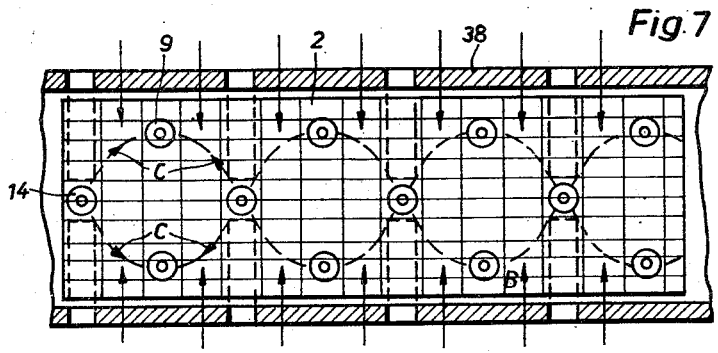
Figure 19:
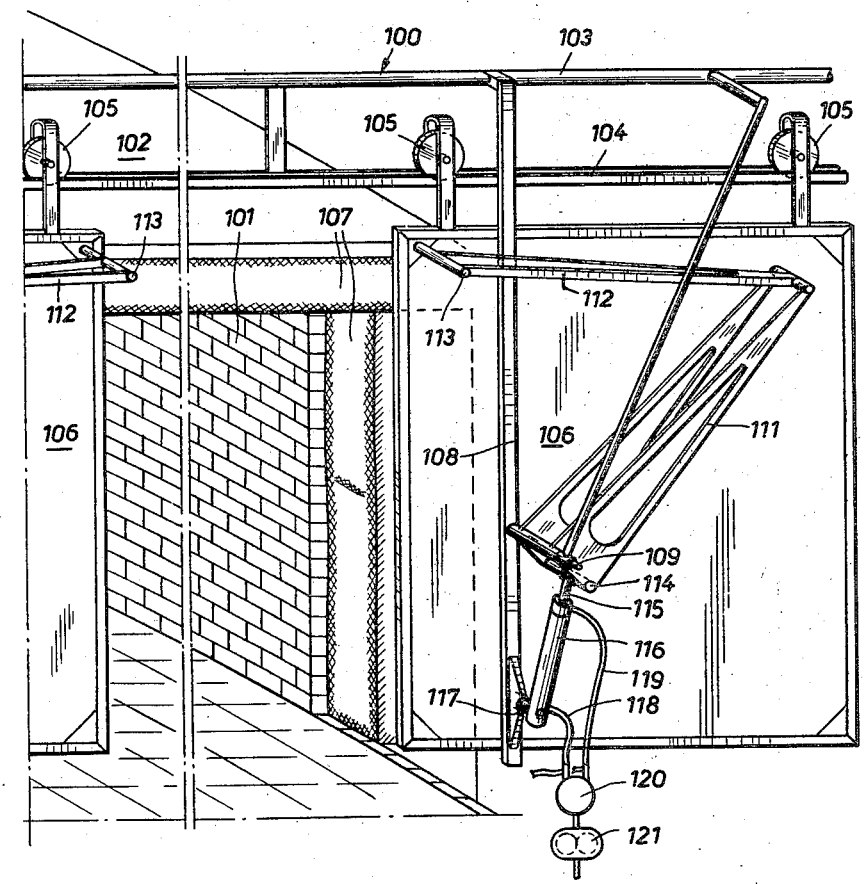

FIG. 1 is a longitudinal section through a stacking pedestal,

FIG. 2 is a top plan view of a stacking pedestal having a circular stacking track, FIG. 3 shows a section through the stacking track, FIG. 4 represents a closure device in a connecting duct, FIG. 5 shows a closure for the passage of hot air and flue gas through the stack bottom, FIG. 6 is a vertical section through a movable kiln travelling on a stacking track, FIG. 7 is a fragmentary horizontal section through the stack of FIG. 6, FIGS. 8 and 9 show two modifications of a stacking pedestal in transverse section, FIGS. 10 and 11 show two further modifications of a stacking pedestal, FIG. 12 shows a detail of a stacking pedestal, FIG. 13 is a transverse section through a stacking pedestal similar to that shown in FIG. 1, FIG. 14 is a fragmentary perspective view of a circular stacking pedestal with the kiln hood, FIG. 15 shows the rear portion of the kiln hood shown in FIG. 14, FIG. 16 is a transverse section through the arrangement in FIG. 14, FIG. 17 is a transverse section through a further example of a kiln, and FIG. 18 is a diagrammatic planview thereof, FIG. 19 is an oven closure having a driving mechanism, and FIGS. 20–22 show a modification including reciprocable pendulum oven.

FIG. 1 represents a stacking pedestal 1 in longitudinal section, carrying a stack of material 2 to be baked and a kiln 3 forming a hood surrounding the stack 2. The kiln comprises a baking zone 4, a preheating zone 5 and a cooling zone 6. The baking zone 4 comprises heating means, such as oil burners 7 which supply heat to the stack of baking material from the sides. Preheated air is supplied to these oil burners, and in addition, a further supply of combustion air will enter through the apertures 8. The flue gas discharge takes place through an opening 9 provided in the bottom of the stack and leading to a longitudinal duct 10 traversing the stacking pedestal 1, from which duct the flue gases are withdrawn by means of a flue gas ventilator or the like. The cooling zone is located in travelling direction behind the baking zone. Ambient air is admitted through the aperture 11 and flows around and cools the portion of the stack situated within this zone. The air current which thus takes up heat is fed through an aperture 12 in the bottom of the stack to the hot air duct 13 in the stacking pedestal 1, flows in the direction of the arrow A, through a further aperture 14 in the bottom of the stack to the preheating zone 5 in order to heat the stack of material in this zone. The flow of the air is caused by the action of a ventilator 16 built into the air discharge 15. Since the hot air duct 13 is located in immediate proximity to the flue gas duct 10, an additional heating of the hot air current occurs, this additional heat being usefully regained from the heat energy otherwise unused and discharged into the open air together with the smoke gases. Likewise some preheating takes place of the combustion air admitted to the point of firing 7 through the shaft 17.

In continuously advancing the kiln hood 3 some bottom openings must be closed, while other openings, such as the closed apertures for the flue gases previously located in the range of the preheating zone 5, must be opened and the openings for the hot air must be closed.

This procedure is shown in FIGURE 2, where the kiln 3 comprising a baking zone 4, a preheating zone 5 and a cooling zone 6 is moving in clockwise direction along a circular stacking track. The flue gas duct 10 and the hot air duct 13 are situated closely side by side in the stacking pedestal and are provided with outlets 9, 14 opening upwardly through the stacking track, and which selectively may be opened and closed by means of valves. The flue gas openings 9 in the zone of the baking section 4 are for instance opened, while the hot air openings 14 is this zone are closed. In the cooling zone 6 and in the preheating zone 5, however, the hot air openings 14 are opened and the flue gas openings 9 closed. From the annular flue gas duct 10 connecting shafts 18 extend radially inwards to a centrally arranged collecting tank 19, in the middle of which the flue gases are drawn off into the open air through the flue gas discharge 20, preferably under the action of a flue gas ventilator. The individual openings of the connecting shafts 18 into the collection tank 19 can be shut off selectively by flaps 21, in order to only expose to draught action certain particular circular sections just located underneath the combustion chamber for the purpose of avoiding losses in suction pressure. The hot air must be transferred from the cooling zone 6 to the preheating zone 5. This will be effected through the hot air duct below the baking zone 4, but it is of advantage, for the purpose of obtaining a low suction pressure, to provide a by-passing and collecting duct 22 of annular form and to connect the latter to the hot air shaft 13 by means of radially arranged connecting ducts 23, flaps 24 being provided on particular openings in order to shut off certain circular sections not participating at the transfer of the hot air.

The radial connecting shafts 18 of the flue gas ducts can be outwardly extended beyond the stacking track and open into a shaft 25, which is provided with flaps or sluice gates 26, in order to enable the cleaning of the ducts from flue dust and deposits. Such gates or flaps can likewise be provided in the annular hot air duct 22 and in the collecting tank 19.

FIGURE 3 shows a section through a stacking pedestal and illustrates, how the hot air duct 13 is arranged between two flue gas ducts 10 in suitable manner for obtaining an intensive heat convection, while the combustion air ducts 17 form the outer boundary of the wall extension and thus heating of the combustion air takes place in the ducts 17 due to transfer of heat from the flue gas duct 10.

FIGURE 4 shows a closure device with flaps 27, provided for example at the opening of the connecting ducts 18 into the collecting tank 19 for the flue gases. The formation of the closure means for the passage of hot air and flue gas through the bottom of the stack is shown in FIG. 5. The valve cone closes by an upward movement, so that the valve seat will be automatically cleaned. Also for the same reasons the closing and opening motion is preferably coupled with a movement of rotation which is effected by a driving member 29 provided with inclined surfaces. The mechanically actuated parts of the valve are preferably placed outside of the hot air and flue gas shafts 10, so that only the valve cone 28 and the valve stem 30 will be situated in the zone of the cross-section of the duct. The operation may for instance be effected by means of a handwheel 31, a screw spindle 32 and a lever system 33, 34.

FIGURE 6 illustrates a section through a hood-shaped movable kiln 3, which travels above and past a stack 2 of baking material placed upon a pedestal-shaped stacking track 1. Arranged in the stacking pedestal 1 are longitudinal shafts, of which the middle one serves as hot air duct 13, while the outer ducts 10, are for exhaust of the flue gases. The flue gas ducts, as above described, are radially connected by means of the connecting ducts 18 to a collecting tank 19, while the hot air duct 13 communicates through connecting ducts 23 with an annular collecting duct 22.

From the gasifying chamber 35 of the oil burner 36 a portion of the fire current passes transversely through a shaft 37, loosely arranged within the baking material, towards the middle of the stack, then moves in upward direction, reverses its direction at the upper dome portion of the kiln and follows a path leading to the opening in the flue gas shaft 10. Since the discharge openings 9 for the flue gases are staggered with respect to the flash of fire entering the shaft 37, said first must traverse the stack diagonally downwards and a uniform heating of the entire stack is obtained by the complementary action of an additional fire current, which first is upwardly deflected by a stone lattice wall 38 partly provided with recesses and from above penetrates the outer zones of the stack. The realization of the mode of burning is mainly ensured by the arrangement of the flue gas shafts 10 in the stacking pedestal.

The sealing of the hood-shaped kiln is brought about immediately above the stacking track by means of a latch secured to the kiln and sliding in a groove 39, which is fastened to the ground, extends along the stacking track, and is filled with sand or water. For the intermittently occurring advancing of the kiln the hood of the kiln is raised by means of hydraulic cylinders 42 supported by the track 41, as indicated by dotted lines in FIGURE 6.

FIGURE 7 is a horizontal longitudinal section through the stack 2 together with the stacking track 1 situated underneath showing the lateral latticestone walls 38 and the discharge openings 9, 14 for the flue gas and the hot air. The arrows B show the direction of the hot gases entering from the sides over the top of the stack, while the arrows C indicate the direction of the hot gas current, which first flows upwardly in the middle of the stack, then reverses its direction and flows towards the discharge openings 9.

FIGURE 8 shows a transverse section through a stacking pedestal 1' upon which the goods 2 are placed. Within this stacking pedestal ducts 43 are arranged, which communicate with the surface of the stacking track by opening 44, to provide for the exhaust of the flue gas or the hot air. As shown, the bulk material is stacked in the shape of a prism, so that the stack cannot collapse under the influence of the baking operation.

A further embodiment of the invention is shown in FIGURE 9, where the bulk material 2 is supported by the pedestal 1" having the shape of a trough. Also in this case it is evident that a natural coherence of the stacked goods is obtained.

The stacking track 1' as illustrated in FIGURE 10 may also be provided with a plane supporting surface by the use of inserting members 45, to enable the baking of large pieces, requiring an even support, such as for instance elongate extruded material 46. In this case additional ducts 47 and 48 are provided in the inserting member 45, which may communicate with the original pedestal ducts 43.

The stacking track 1''' may also be assembled from different single parts, as shown in FIGURE 11, particularly for the purpose of reducing the convection of heat to certain zones of the stacking track. For example, a groove 49 may be provided in a form piece 50, which consists of a low-conducting material, a packing tube 51, according to FIGURE 12 and made e. g. from asbestos material, being inserted into said groove and engaging with its other half a complementary groove 52 provided on the movable kiln portion 53, said tube being inflated during standstill of the kiln, to obtain a perfect sealing effect, while the air is let off from this tube whenever the hood 53 of the kiln shall be displaced.

FIGURE 13 shows the same construction of the stacking pedestal 1' as in FIGURE 1, but with the difference that the radially arranged discharge and by-pass ducts 54 are laterally connected to the stacking pedestal, and are on the same level as the pedestal. The inner rail 55 for the carriage 56 of the movable kiln hood is placed somewhat higher above the branch ducts, while the outer rail 57 for the outer carriage 58 of the kiln hood 53 is arranged on the kiln level.

FIGURE 14 illustrates a preferably circular stacking pedestal 61 together with the kiln hood 62 movable thereon, which is intermittently advanced in the direction of the arrow A', while the pedstal 61 provided with the stacking surface 63 of trough-shaped formation is stationary. The kiln hood 62 is preceded by a casing 64, which is formed to correspond to the inner sectional shape of the kiln and provided with an oblong opening 66 for the admission of the material 65.

In advancing the kiln hood 62 with the travelling casing 64, the material stacked to a shape corresponding to the kiln arrives in the baking chamber. A stack of this form, which may have a considerable length depending on the equpiment, could, however, never be uniformly traversed until the interior thereof is baked by the burning gas stream. For this reason, tapering members 67 of circular square or rectangular cross section are inserted into the travelling casing 64 prior to the filling operation; when the stacking is completed these members are withdrawn from the casing, before the kiln hood 62 continues its travel. The stack then maintains this loosened form in the kiln, whereby the hot gas current is able to enter the interior of the stack through the ducts thus formed.

FIGURE 15 shows the rear portion of the kiln hood 62 which according to the invention is complemented by preheating and cooling chambers. The baked material 63 leaving the hood 62, will have the tendency of collapsing outwardly. For this purpose a movable casing 69 is disposed also at this side of the hood 2 and provided with an upper opening 70; the baked material may then be withdrawn through this opening 70, for instance by means of a grabbing device 71.

FIGURE 16 is a cross-section through the travelling casing 64 preceding the kiln hood, having extension members 72 for guiding the members 67. For the extraction of the members in the first initial stage a hydraulic or pneumatic piston 73 may be used. It is also shown that a vibrator 74 may be placed upon the head of the members 67, in order to facilitate the filling operation, and also the extraction of said form-pieces.

In the example of FIGS. 17 and 18 a stack 82 of baking material is placed on a circular stacking track 81. The stack 82 is upwardly tapering so that in raising the movable hood 83 enclosing the stack 82 the spacing between the inner wall of the hood and the stack of baking material increases. For moving the kiln hood along the stack, this fact is of importance since collisions with projecting stack portions are thereby avoided. The arrangement is heated by means of burners 84 the flames of which are directed towards the baking material.

The two sides of the kiln hood 83 are supported each upon a floating body 85 floating each in a channel 86 which is arranged adjacent the stacking track 81 and filled with the supporting fluid 87 (which may be water or other suitable liquid). The floating bodies 85 are connected to the kiln hood by means of a tight-fitting closure wall 88, whereby a perfect sealing of the inner space of the kiln can be obtained. The level of the liquid 87 can be regulated so that the kiln hood will be raised or lowered. As the kiln hood is lowered the inner edge 89 of the hood enters a groove 90 extending along the stacking track, in order to reduce the baking room and to avoid a dissipation of heat and a contamination of the liquid in the channel 86. Owing to a corresponding lowering of the liquid level, the kiln hood 83 during the baking operation, thus during standstill, is able to firmly rest upon the extension 78. Moreover, it must be noted with respect to the floating kiln hood, that the lowering of the hood in the present case serves for the purpose of obtaining a perfect lateral seal with respect to the liquid 7. In the ceramic oven according to the invention it is of advantage that sealing action takes place in the groove 90, since the tight placing of the hood upon the pedestal reduces the heat losses and protects the floating liquid.

The centering of the hood 83 with respect to the pedestal 81 is in the present case effected by centering rollers 91, which are supported in pillow blocks 92 and about against guide rails 93 provided on the floating bodies 85.

From FIGURE 18 it is evident that the liquid carrying chanels 86 extend at either side all around the stacking track 81. The centering of the kiln hood is effected by an axle 94, which is arranged in the centre of the circular arrangement and is connected to the kiln hood 83 by means of struts 95. Power for rotation of the hood can be transmitted by means of said struts 95. They may also be utilized as holding rods for conduits or the like. In order to enable a rapid raising and lowering of the kiln hood 83, the liquid channels 86 can be subdivided in sluice like manner by the insertion of partition walls 96, which will be displaced according to the advancing motion of the kiln hood. In this manner it is possible to substantially accelerate the raising and lowering of the kiln hood by the filling or evacuating of a smaller amount of liquid.

A closure member for a kiln is diagrammatically illustrated in FIG. 19. This member comprises a framework designated by the numeral 100, which extends across the opening 101, to be closed, of the hood-shaped kiln 102 and in a manner not described in detail is operatively interconnected with the kiln 102, i.e. movable together with said kiln. A guide rail 104, on which are suspended two countermovable door wings 106 of a sliding door by means of operating wheels 105, is suspended from a traverse 103 of the framework 100 and extends transversely over the opening 101. The door wings 106 abut against a sealing bulge 107 surrounding the opening 101, which bulge can be axially compressed or expanded in the manner of bellows in order to permit a slight adjustment of the doors in direction towards the kiln 102 or in opposite direction. For this purpose provisions, not shown in detail, are made, permitting the framework 100 to be moved closer to the kiln 102 or further away from the latter. The most simple solution of this task is to equip the framework with its own driving mechanism and to support it on the tracks of the kiln, adjustable connecting members being provided between kiln and framework.

The framework 100 comprises a cantilever 108 which extends downwards from the traverse 103 and on which a bearing pin 109, positioned at right angles to the plane of the door wings 106, is secured. A strutting member 110, supported with its other end on the traverse 103, engages the free end of the bearing pin 109, in order to import sufficient stability to said bearing pin. Pivotally mounted on the bearing pin 109 is a hinged arm 111, the free end of which is connected by means of a guide 112 with a door wing 106, shown in the drawing at the right-hand side. The guide 112 engages a hinge shaft 113 mounted on a door wing 106. The hinged arm 111 is provided with an articulated shaft 114 extending parallel to the bearing pin 109, on which shaft the piston rod 115 of a hydraulic double-acting operating cylinder 116 attacks. The latter cylinder is pivotally anchored on a supporting pin 117 of the cantilever 108. The lifting cylinder is connected in known manner to a pressure source 121 by means of ducts 118, 119 and a control member 120. The described arrangement, generally comprising the cantilever 108, hinged arm 111, guide 112 and also operating cylinder 116, naturally is also present in a corresponding arrangement in connection with the lefthand door wing, in which case, of course, both stroke cylinders are controlled by the common control member 120.

Based on the drawing, it is evident that the two door wings 106 can be closed or opened by means of the operating cylinder. In the first case, the movement of the door wings 106 initially is relatively rapid and gradually slows down to the extent as the bellcrank levers, formed by the hinged arms 111 together with the associated guide 112, approach their stretched condition. In closed position the two door wings can be urged against each other with great force corresponding to the leverage ratio, reaching a maximum at this instance, and the door permits in this case a perfect sealing action. In the manner described, the horizontally movable door wings can be built of solid, massive structure and without limitation with respect to weight but solely with regard to obtaining best insulation, which possibility no doubt is precluded in the known vertical doors movable by means of counterweights. The mentioned adjustability of the door wings in the direction towards the oven or vice versa facilitates the entering of the wings into the small parting lengths between the individual successive sections of the stack of baking material.

Generally, it has to be noted that the kiln ceiling can be formed as double-curved surface, in which case the dome joints will reliably close, and static advantages will be obtained.

As illustrated in FIGURES 20–22, the movable kiln 3' consists of a baking chamber 4', a preheating chamber 5' and a cooling chamber 6' and generally corresponds to the kiln 3 shown in FIGURE 1, with the exception that in this case the stack 2' of baking goods and the stack track 1' extend in rectilinear manner. Accordingly, the kiln 3' is not of curved design as in FIGURE 1. Such a rectilinear kiln, however could be combined from the segments of an arcuate kiln 3. For this purpose the two outer segments only had to be rotated each through 180° from their standard position and added in this position to the middle segment.

At the kiln according to FIGURES 20–22 the two outer chambers are interconnected by a transition duct 122, by means of which the hot air removed from the cooling zone is fed to the preheating zone. A ventilator 123 is arranged in each outer chamber. When the kiln then is displaced in the direction of the arrow $P_{20}$ (FIGURE 20), the ventilators 123 produce an air current, passing from the rear chamber, the cooling chamber 6, to the front chamber and into the preheating chamber 5'.

From the end position according to FIGURE 21, after the finish-baked stack has been replaced by a fresh unbaked one, the kiln 3' then is started in opposite direction in the sense of the arrow $P_{21}$, the direction of rotation of the ventilators 123 being likewise changed such that the hot air flows from the rear chamber to the front chamber. FIGURE 22 indicates the repetition of the baking operation also already illustrated in FIGURE 20. The kiln thus is able to move to and fro, the stacking being set anew after each reversal and the direction of rotation of the ventilators is selected so, that the rear chamber always acts as cooling chamber and provides the front preheating chamber with hot air.

What I claim is:

1. Apparatus for baking ceramic material of the type having a track for supporting the material to be baked and having a kiln which is movable along the track in operative relation with said material, the kiln providing preheating, baking and cooling zones, said track comprising an elevated pedestal of trough shape the material being supported in the trough shape of the pedestal, so that the material is laterally engaged, said elevated pedestal defining a space therebeneath and duct means in said space and connecting said zones for selectively transferring heat therebetween.

2. Apparatus as claimed in claim 1 comprising heat insulating means on said pedestal for insulating the duct means from said kiln compriisng an inflatable tube which in inflated condition constitutes a seal between the duct and kiln and in deflated condition enables the kiln to move with respect to the pedestal.

3. Apparatus as claimed in claim 1 wherein said track comprises means adjacent the pedestal for movably supporting the kiln, the track defining a circular path of movement for the kiln, the track having radially inner and outer surfaces, the last said means including a rail at the inner and outer surfaces of the track, the rail at the inner surface being elevated with respect to the other rail, and a radial duct beneath the rail at the inner surface and in communication with the duct means.

4. Apparatus as claimed in claim 1 comprising a casing coupled to said kiln and movable therewith, the casing being adapted for receiving the material to be baked and having a contour conforming to the interior of the kiln in the baking zone, so that the material is stacked in the casing according to the shape of the kiln in the baking zone.

5. Apparatus as claimed in claim 4 comprising a second casing coupled to said kiln and movable therewith, the kiln having opposite ends and each of the casings being at opposite ends of the kiln, the second casing advancing over the baked material subsequent to that of the kiln, and having a contour conforming to the interior of the kiln so that the baked material is laterally supported and prevented from collapsing, said second casing having an opening so that the baked material can be removed therefrom.

6. Apparatus as claimed in claim 1 wherein said kiln moves periodically on said track, comprising hood means in said kiln adapted for constituting the baking zone, the hood means being vertically movable between raised and lowered positions, the hood means in the raised position enabling periodic movement of the kiln along said track and in the lowered position position providing a chamber for the baking zone, means for sealing said chamber with the hood means in the lowered position, and means for raising and lowering said hood means comprising a floating body on said hood means, means containing a liquid, the floating body being in said liquid and supporting said hood means and causing the same to assume an elevation which is dependent on the level of the liquid.

References Cited in the file of this patent
FOREIGN PATENTS 1,202,269     France _____ July 20, 1959